United States Patent [19]

Yagi et al.

[11] Patent Number: 4,908,932
[45] Date of Patent: Mar. 20, 1990

[54] METHOD OF MANUFACTURING A TORQUE SENSOR

[75] Inventors: Toru Yagi; Tsuneo Takahashi; Masayuki Nishiguchi, all of Saitama, Japan

[73] Assignee: Honda Giken Kogyo Kabushiki Kaisha, Tokyo, Japan

[21] Appl. No.: 260,112

[22] Filed: Oct. 20, 1988

Related U.S. Application Data

[62] Division of Ser. No. 19,599, Feb. 26, 1987, Pat. No. 4,817,444.

[30] Foreign Application Priority Data

| Mar. 3, 1986 | [JP] | Japan | 61-44255 |
| Mar. 3, 1986 | [JP] | Japan | 61-44256 |
| Mar. 3, 1986 | [JP] | Japan | 61-44257 |
| Mar. 3, 1986 | [JP] | Japan | 61-44258 |
| Mar. 3, 1986 | [JP] | Japan | 61-44259 |

[51] Int. Cl.$^4$ ............................................. H01F 7/06
[52] U.S. Cl. .................................... 29/602.1; 29/458; 228/173.6; 228/208; 228/212
[58] Field of Search ..................... 29/458, 602.1; 228/173.6, 208, 212; 73/862.35, 862.36, DIG. 2

[56] References Cited

U.S. PATENT DOCUMENTS

| 2,392,293 | 1/1946 | Ruge | 73/862.35 |
| 2,566,566 | 9/1951 | Howes | 73/862.33 |
| 4,616,512 | 10/1986 | Himmelstein | 73/862.36 |

Primary Examiner—P. W. Echols
Attorney, Agent, or Firm—Lyon & Lyon

[57] ABSTRACT

A torque sensor comprising a magnetic member whose magnetostrictive characteristics vary with the amount of torque applied thereto and coils for detecting magnetostrictive variation disposed opposite the magnetic member, and a method of manufacturing the same. The torque sensor is constituted as an independent unit separate from the shaft whose torque is to be measured. The independent unit consists of a cylindrical member having the magnetic member attached thereto and an enclosure member which is provided with the coils and is mounted so as to cover the cylindrical member and be rotatable about the same axis as the cylindrical member. The method of manufacturing the torque member comprises the steps of first copper plating and then solder plating a torque transmission member and a magnetic member destined to be attached to the outer circumference of the torque transmission member, wrapping the magnetic member on the torque transmission member, and solder-bonding the torque transmission member and the magnetic member by heating them while uniform pressure is being applied to the entirety of the wrapped region.

12 Claims, 11 Drawing Sheets

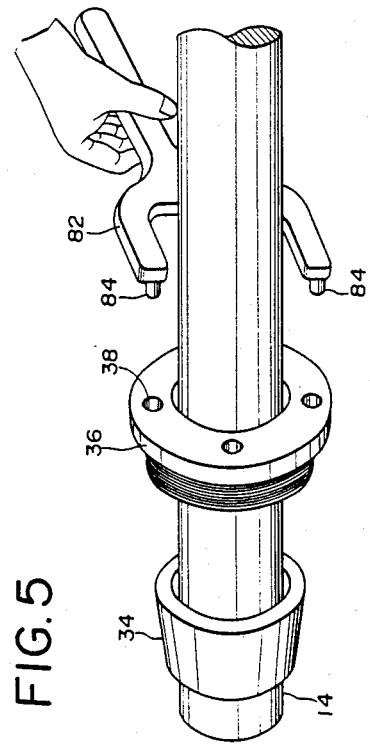
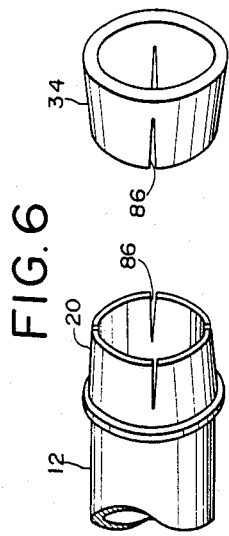
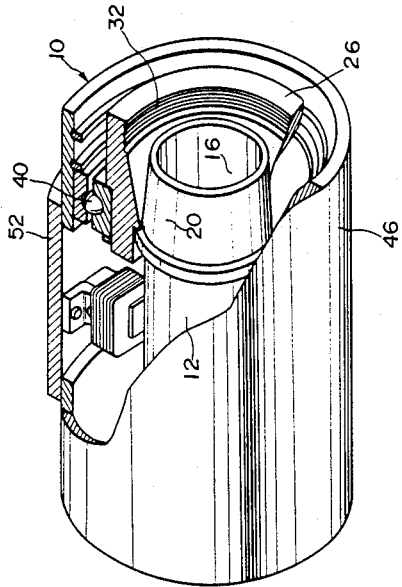
FIG. 5
FIG. 6

(a)

(b)

(a)

(b)

(c)

METHOD OF MANUFACTURING A TORQUE SENSOR

This is a divisional of co-pending application Ser. No. 019,599 filed on Feb. 26, 1987, now U.S. Pat. No. 4,817,444.

BACKGROUND OF THE INVENTION

1. Field of the Invention

This invention relates to a torque sensor for detecting the torque of a rotating shaft, more particularly to a magnetostriction type torque sensor for measuring the torque of a drive shaft, steering shaft or other rotating shaft of an automobile and the like, and to a method of manufacturing the same.

2. Description of the Prior Art

The indirect type torque sensor which measures the torque of a shaft by sensing the amount of twist therein is unable to measure static torque. Because of this inadequacy, there have recently been introduced a number of direct type torque sensors operating on the principle of magnetostriction. As an example of such a torque sensor there can be mentioned the one described in Japanese laid-open Patent Publication No. 57(1982)-211030, wherein a ribbon-like magnetostrictive strip is wound on a shaft whose torque is to be measured. A similar torque sensor was also disclosed in Japanese laid-open Patent Publication No. 59(1984)-166828.

The structure of the torque sensor disclosed by this publication requires that the magnetostrictive member (magnetic member) be fixed directly on the shaft whose torque is to be measured so that the shaft itself becomes one component of the torque sensor. This is disadvantageous for several reasons. First, during manufacture of the torque sensor, it is generally necessary to attach the magnetostrictive member to a shaft of considerable length such as an automobile drive shaft, and this is difficult to do with high positional precision. Then, after the magnetostrictive member has been fixed on the shaft and up to the time that the shaft is installed in the vehicle, which is generally late in the assembly process, it is necessary to take great care in transporting and storing the shaft bearing the magnetostrictive member so as to protect the member from damage and adherence of dust or the like. The need to take these precautions greatly complicates the overall process of shaft installation.

Moreover, since the shaft whose torque is to be measured is involved as one component of the sensor, the sensor cannot be completed without mounting the other components on the shaft. As a result, it is not possible to adjust the gap between the magnetostrictive member and the associated coils until the assembly is carried out. Another disadvantage arises from the fact that drive shafts and other such automotive parts are only required to have adequate strength and are not required to have high dimensional precision. It therefore becomes necessary to use a special, separate adjustment means for adjusting the gap, which leads to further inconveniences as regards inventory control, performance control, maintenance and the like.

Also, since the structure is such that the coil and other components which are relatively susceptible to damage by mechanical shock are not capable of being easily removed form the exterior, special care has to be exercised during assembly and installation. This structure is also disadvantageous from the point of maintenance.

The conventional magnetostrictive type torque sensor has further required that a magnetic material exhibiting magnetostriction (e.g. a magnetic amorphous film) be attached to the outer periphery of the torque transmission member or shaft. In this case, if a large gap is present between the torque transmission member and the magnetic member attached thereto, an error is apt to arise in the measurement because of slippage between these two members, while also disadvantageously cracks and other forms of physical degradation are likely to occur with prolonged use, thus shortening the service life of the sensor. It has therefore been necessary to make every effort to minimize the size of the gap between the torque transmission member and the magnetic member at the time of attachment. Methods aimed at achieving this are disclosed in Japanese laid-open Patent Publication 57 (1982)-2110930 and elsewhere and include a method of mold-bonding the entire magnetic member using a synthetic resin bonding agent, a method of attachment by heat fusion involving spot welding or the like, a mechanical attachment method involving the use of bands or the like, and a method involving copper plating followed by solder attachment. The first-mentioned method of resin bonding has problems regarding heat resistance as well as durability over prolonged use. The heat fusion (welding) method is not appropriate for use with a magnetic amorphous member since the characteristics of amorphous materials are easily degraded by heat. As regards the third-mentioned mechanical attachment method, this is not capable of providing reliable attachment over the entire attachment surface. While the last-mentioned solder attachment method has the best potential, it is still inadequate as regards durability.

SUMMARY OF THE INVENTION

In view of the aforesaid shortcomings of the conventional torque sensors, it is an object of the present invention to provide a torque sensor which is constituted as an independent unit separate from the shaft whose torque is to be measured and in which the shaft is not involved as a component of the torque sensor.

Another object of the invention is to provide a method of manufacturing a torque sensor wherein a magnetic member is securely attached to a torque transmission member or shaft with the gap between the two members held to the absolute minimum, degradation of the magnetic member by heat during the attachment operation is prevented, and high durability over prolonged use is ensured.

For realizing these objects the present invention provides a torque sensor comprising a magnetic member whose magnetostrictive characteristics vary with the amount of torque applied thereto and coils for detecting magnetostrictive variation disposed opposite the magnetic member, the torque sensor being constituted as an independent unit separate from the shaft whose torque is to be measured. The independent unit consists of a cylindrical member which can be freely mounted on and removed from the shaft whose torque is to be measured and has the magnetic member attached to the surface thereof, and an enclosure member which encloses the cylindrical member and has the coils attached thereto.

The present invention further attains the aforesaid objects by providing a method of manufacturing a torque sensor comprising the steps of separately copper plating a torque transmission member and a magnetic member for attachment around the periphery thereof, solder plating the copper plated members, wrapping the magnetic member onto the torque transmission member, and solder-bonding the two members together by applying heat over the entire wrapped portion while simultaneously applying uniform pressure thereto.

The above and other features of the present invention will become apparent from the following description made with reference to the drawings.

BRIEF DESCRIPTION OF THE DRAWINGS

FIG. 5 is an explanatory view showing the method of attaching the torque sensor to a shaft whose torque is to be measured;

FIG. 6 is an explanatory view showing slits formed in a cylindrical member and in a tapered ring;

DESCRIPTION OF THE PREFERRED EMBODIMENTS

Figure 1:
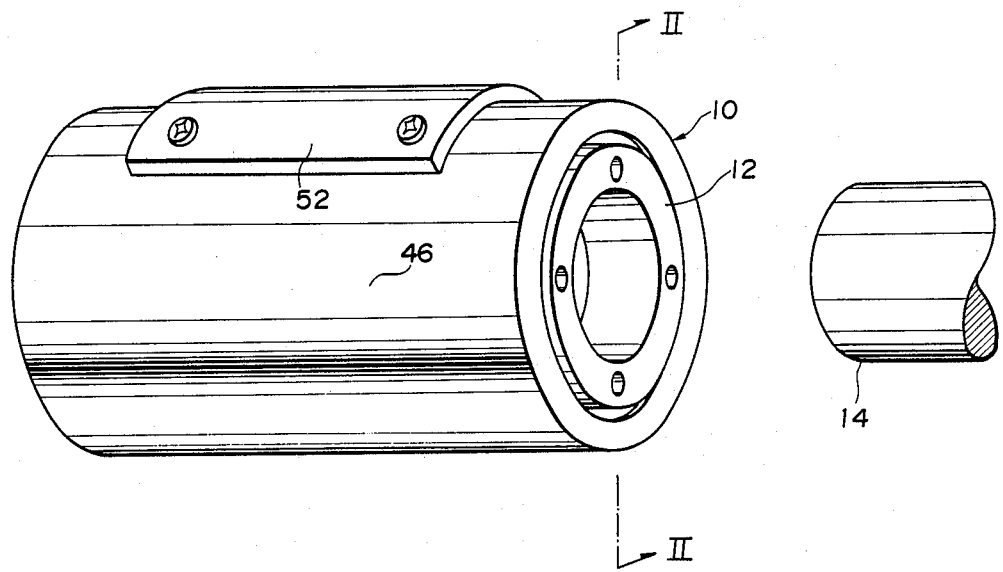
FIG. 1 is a perspective view of a first embodiment of the torque sensor according to the present invention.
Figure 2:
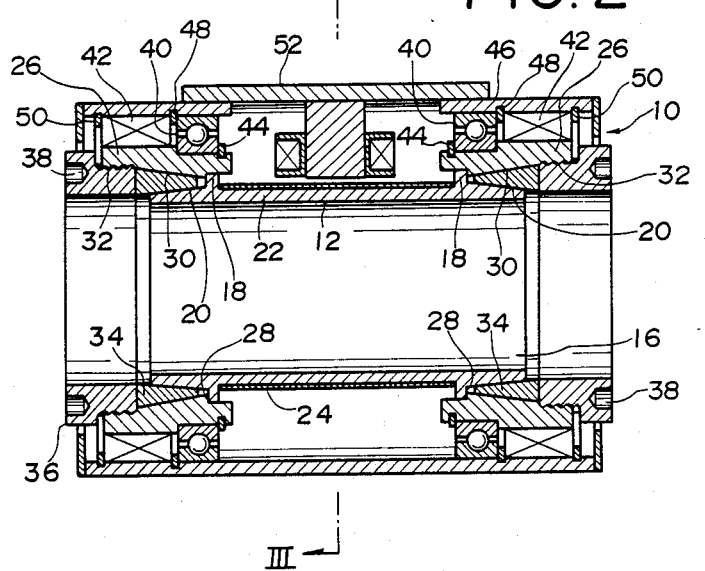
FIG. 2 is a sectional view of the same taken along line II—II in FIG. 1.

To begin with, a first embodiment of the invention will be described with reference to FIGS. 1 to 9. As shown, a torque sensor 10 has a cylindrical member 12. In the illustrated embodiment, the cylindrical member 12 is substantially a true cylinder of circular cross-section and has a bore 16 of a diameter slightly larger than the diameter of a shaft 14 whose torque is to be measured. The bore 16 runs the full length of the cylindrical member 12. The arrangement is such that the shaft 14 can be inserted into the bore 16, whereafter the cylindrical member 12 can be fixed to the shaft 14 in a way that will be explained later. The cylindrical member 12 has collars 18, 18 provided as annular protuberances near either end, and the part of the cylindrical member 12 between each collar 18 and the closer of the free ends is formed as a tapered portion 20, 20. The part of the cylindrical member 12 between the collars 18, 18 constitutes a cylindrical portion 22 of constant diameter throughout its full length. The cylindrical portion 22 has a magnetic amorphous film 24 fixed thereon as by plating or some other means.

Fastening rings 26, 26 of an inner diameter larger than the outer diameter of the cylindrical member 12 are fitted over the cylindrical member 12 from opposite ends thereof. Each fastening ring 26 has a shoulder 28 which comes into abutting engagement with the associated collar 18, thus fixing the ring on the cylindrical member and preventing the movement of the rings toward each other. The inner surface of the ring 26 is formed with a tapered surface 30 extending outward from the shoulder 28 to near the outward end of the ring 26. The tapered surface 30 is inclined oppositely from the tapered portion 20 of the cylindrical member 12 so that a V-shaped recess is formed between the two. The portion of the inner surface of the ring 26 extending outward from the outer end of the tapered surface 30 is formed with an internal thread 32. A tapered ring 34 of wedge-shaped cross-section is inserted into the V-shaped recess and an externally threaded retainer ring 36 is screwed into the threaded portion 32 of the ring 26 from the outside so as to abut onto the tapered ring 34. As a result, as the retainer ring 36 proceeds inwardly, the tapered ring 34 is pressed progressively inward so that the resulting wedge action causes the tapered portion 20 to be pressed onto the shaft 14. The cylindrical member is accordingly fixed on the shaft whose torque is to be measured. In the drawings, the reference numeral 38 denotes tool insertion holes formed in the retainer rings 36 for allowing insertion of the tool used for screwing in the retainer rings.

On the outer periphery of each of the fastening ring 26 is embeddedly fitted a bearing 40, and immediately outward from each of the bearings 40 there is disposed an oil seal 42. The reference numeral 44 indicates a ring inserted to prevent lateral movement of the bearing 40.

Outward of the bearings 40 is provided an enclosure member 46 which serves as an outer covering for the unit. As the enclosure member 46 is coupled with the fastening rings 26 and the cylindrical member 12 via the bearings 40, it is able to rotate independently of the fastening rings 26 and the cylindrical member 12 so that when the cylindrical member 12 rotates (together with the shaft 14), the enclosure member 46 can be maintained stationary, i.e. can be prevented from rotating together with the cylindrical member and the shaft. The reference numerals 48 and 50 denote rings embeddedly fitted in the enclosure member 46 for preventing lateral movement of the bearings etc.

Figure 3:
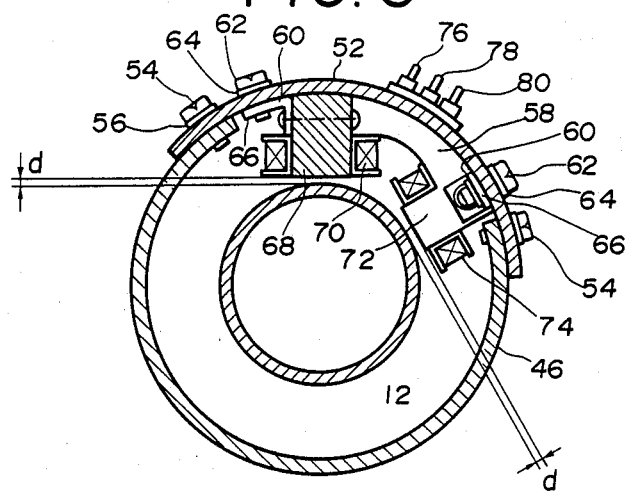
FIG. 3 is a sectional view of the same taken along line III—III in FIG. 2.
Figure 4:
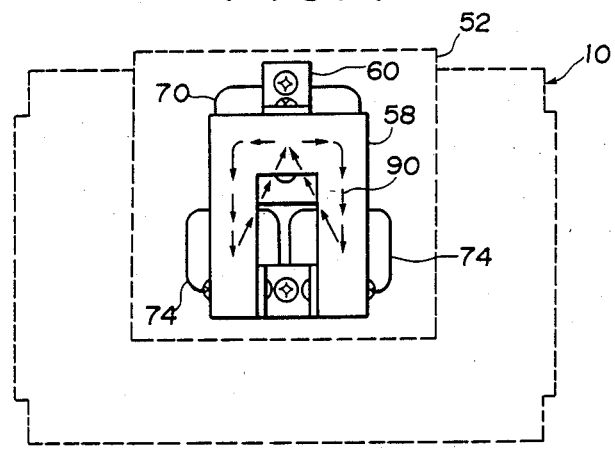
FIG. 4 is an explanatory view for showing how coils are attached to the inner surface of a cover.

As best shown in FIG. 3, the enclosure member 46 has a cylindrical inner surface and has one portion cut away to provide an opening. The opening is closed by a cover 52 which is fixed on the enclosure member 46 by screws 54, 54 screwed into threaded holes provided in both the enclosure member 46 and the cover itself through washers 56. In this connection, it should be noted that the cover 52 can alternatively be attached in any of various other ways, the only requirement being that the mode of attachment allow removal of the cover 52 to the outside in the manner that will be explained later. A core 58 made of silicon steel sheet material and having a yoke-like configuration when viewed from underneath (see FIG. 4) is attached to the cover 52 by stays 60 in combination with screws 62, washers 64 and nuts 66. As shown in FIG. 3, the steel core 58 is bowed so that the back surface thereof in contact with the inside surface of the cover 52 has the same radius of curvature as the inner surface of the cover 52. As a result, the core 58 can be mounted in close contact with the inside surface of the cover 52, which, as will be explained later, helps make it possible to ensure that intercomponent gaps will be maintained uniform. A magnetic pole 68 is disposed vertically near the center of the yoke-shaped core 58 and a coil is wound thereon to form an excitation coil 70. Further, two magnetic poles 72, 72 are similarly disposed at symmetrical positions with respect to the yoke-shaped core 58 so that one is positioned in the vicinity of the tip of each branch thereof. The magnetic poles are wound in opposite winding directions with coils so as to form a pair of detection coils 74, 74. The reference numerals 76, 78 and 80 denote terminals of the respective coils. Thus, the coils and all other components that are susceptible to damage by mechanical shock are mounted on the cover 52. As a result, in attaching the torque sensor to the shaft whose torque is to be measured, it is possible to first attach the main unit of the torque sensor to the shaft and then, after the attachment is completed, to attach the cover to the main unit from the outside. This method of mounting the torque sensor results in improved operational efficiency and also makes it easier to replace coils and carry out other maintenance work.

Next, the method of attachment of the torque sensor to the shaft whose torque is to be measured will be explained, followed by an explanation of the method of use.

As shown in FIG. 5, for fixing the torque sensor 10 to the shaft 14, the retainer ring 36 and the tapered ring 34 are fitted over the end of the shaft 14 in this order and the end of the shaft 14 is then inserted into the bore 16. Next, the tapered ring 34 is slid along the shaft 14 and inserted into the V-shaped recess between the tapered portion 20 and the tapered surface 30, whereafter the retainer ring 36 is slid along the shaft 14 and then screwed into the threaded portion 32. As shown in the figure, this operation can be conveniently carried out using a tool 82 having pins 84, 84 which fit into the tool insertion holes 38 of the retainer ring 36. As the retainer ring 36 is screwed in, it presses onto the tapered ring 34 forcing it deeper into the recess and producing a wedge effect on the tapered portion 20 of the cylindrical member 12. As a result, the tapered portion 20 is pressed onto the shaft 14 and fixed so strongly thereto that no slippage can occur between the cylindrical member 12 and shaft 14. In this connection, the fastening effect can be further enhanced by providing both the tapered portion 20 and the tapered ring 34 with slits 86, 86 as shown in FIG. 6 so as to facilitate deformation in the radial direction.

Figure 7:
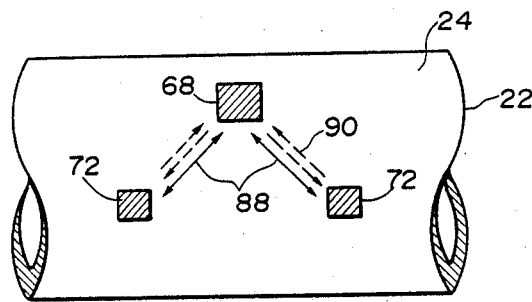
FIG. 7 is an explanatory view showing the positioning of coils.

When the attachment has been completed in this way, any amount of torque applied to the shaft 14 will be transferred to the cylindrical member 12 as a torque of identical magnitude. Thus, as is well known, the compressive and tensile stress produced in the magnetic amorphous film 24 as a result of this torque will give rise to magnetostriction therein. As a result of having been subjected to heat treatment and the like in the presence of a magnetic field, the magnetic amorphous film 24 is, as shown in FIG. 7, conferred with uniaxial magnetic anisotropy 88 oriented at angles of ±45 degrees relative to the axis of the cylindrical member 12 and manifested mainly as compressive and tensile stress. Further, the aforesaid coils are arranged such that lines connecting the magnetic poles thereof form a right isosceles triangle, with the pole 68 of the excitation coil 70 positioned at the uppermost right angle and the two poles 72, 72 of the two detection coils 74 located at the respective lower 45-degree angles, and further with the pole 68 of the excitation coil 70 located at the branching point of the aforesaid uniaxial magnetic anisotropy. As a result, the flux paths 90 between the excitation coil pole 68 and the respective detection coil poles 72 coincide with the directions of the anisotropy, so that the permeability is supplemented to the maximum.

Figure 8:
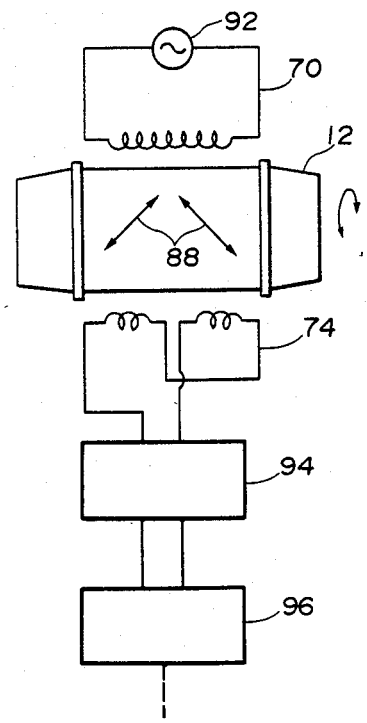
FIG. 8 is a block diagram illustrating the detection operation of the torque sensor according to the invention.

In the torque sensor of the aforesaid structure, when, as shown in FIG. 8, the excitation coil 70 is excited by application thereto of current from an AC power source 92, the detection coils 74, 74 are able to detect any change in permeability resulting from magnetostriction caused by the aforesaid application of torque, and produce outputs corresponding to the electromotive force induced therein. Then when these outputs are differentially extracted, appropriately amplified by an amplifier 94 and rectified by a rectifier 96, it becomes possible to determine the rotational direction from the phase of the outputs and to determine the magnitude of the torque from the value of the outputs. As the detection outputs are extracted by use of differential connection, the shaft 14 will have no effect on the results of the measurement even if it is made from a ferromagnetic material.

Figure 9:
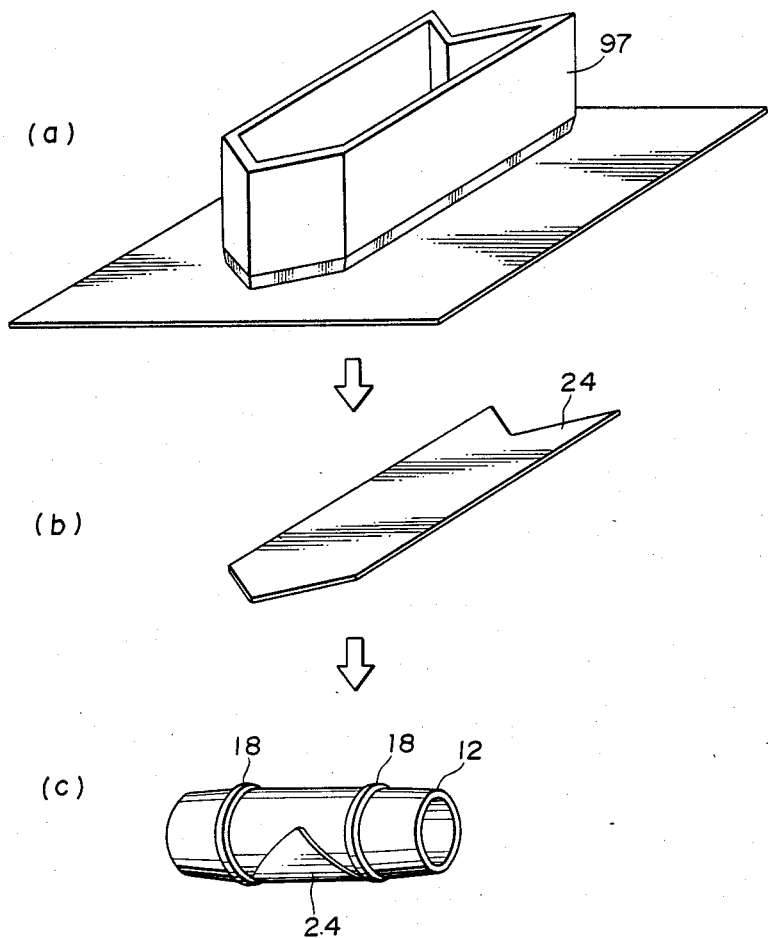
FIGS. 9(a), 9(b), and 9(c) are explanatory views showing the steps for fabrication of a magnetic amorphous film.

As shown in FIG. 9 (a), 9(b), and 9(c) an arrow-shaped or rectangular strip is cut in a single punching action from a wide sheet of magnetic amorphous film using a cutter 97 (FIG. 9(a)), thus fabricating the magnetic amorphous film 24 (FIG. 9(b)) which is then attached to the cylindrical portion 22 of the cylindrical member 12 by a plating method or the like (FIG. 9(c)). As the cylindrical portion 22 has the collars 18, 18 at its opposite ends, these can be used as positioning guides in the attachment of the magnetic amorphous film 24. Thus, if the magnetic amorphous film is cut precisely to the predetermined width and its attachment is carried out using the collars as positioning guides, it becomes possible to position the attached magnetic amorphous film at precisely the predetermined position, which not only enhances the operational efficiency of the fabrication work but also enables improved measurement accuracy because it ensures that the distance between the magnetic amorphous film and the detection coils will be uniform along all torque sensors manufactured in this way.

Since the torque sensor according to this invention is realized as an independent unit which does not use the shaft whose torque is to be measured as one of its constituent elements, it need only to be attached as it is to the shaft at some appropriate stage of the vehicle assembly operation. The cylindrical member to which the magnetic amorphous film is attached is considerably shorter than a drive shaft or the like and is therefore much easier to handle. It also leads to improved operational efficiency from the point that its heat capacity is small. Further, the fact that the magnetic amorphous film is covered and protected by the enclosure member results in an additional increase in operational efficiency since less care is necessary for protecting it from damage and the adherence of dust and the like during transport, storage and mounting. While the fact that the torque sensor is constructed as an independent unit might be expected to give rise to problems if its attachment to the shaft whose torque is to be detected should be such that slippage could occur between the two, since under such circumstances it would not be possible to carry out accurate detection, the torque sensor according to the present invention is entirely free from any such problem since it provides a highly reliable method of attachment based on the wedge effect of tapered rings. Moreover, since the number of components requiring precise positioning with respect to one another has been kept to the minimum, it is not particularly difficult in the course of fabrication to assure that the positions of the bearings 40 and the dimensions of the enclosure member 46, the cover 52 and the core 58 etc. are maintained within the prescribed tolerances. This, plus the effect obtained as a result of the cylindrical member and the enclosure member being cylindrical, enables the gap "d" (FIG. 3) between the coils and the surface of the attached magnetic amorphous film to be maintained at a constant magnitude, thus eliminating the need for any special adjustment means, making it possible to realize a compact, light and low cost torque sensor, and reducing dimensional variance and, consequently, detection output variance among different torque sensors manufactured in accordance with this invention.

Other embodiments of the torque sensor according to the present invention will now be described.

FIGS. 10(a) and 10(b) shows a magnetic amorphous film used in a second embodiment of the torque sensor according to the invention. As will be noted from the developed view of the magnetic amorphous film shown in FIG. 10(a), the film is provided with a plurality of slits 98 so oriented that when the magnetic amorphous film is attached to the cylindrical member 12 as shown in FIG. 10(b), the slits 98 will make the same angles of ±45 degrees with respect to the axis of the cylindrical member 12 as the lines of uniaxial magnetic anisotropy 88, i.e. will lie in the directions in which the variation in permeability is greatest. As a result, the provision of the inclined slits produces an anisotropic effect that derives from the configuration and as this anisotropy is added to the uniaxial magnetic anisotropy 88, the variation in permeability becomes even larger, meaning that the measurement accuracy increases accordingly. It is also noteworthy that since the area occupied by the magnetic amorphous film is greater than that occupied by conventional rectangular shaped films, there is obtained a higher degree of output sensitivity, and that even with the slits, the overall arrow-like configuration of prescribed width is still maintained so that the same improvement in operational efficiency is obtained as a result of the attachment positioning enabled by the collars 18, 18 serving as positioning guides on the cylindrical member. The graph of FIG. 11 shows the result of a test in which the torque sensor according to the second embodiment was compared with the beforementioned conventional torque sensor. In the test, the excitation frequency was 10 KHz, the excitation current 50 mA, and both the excitation coil and the detection coils were formed with 900 turns of coil wire, while the material of the shaft whose torque was to be measured was made from SUS 304 steel.

Curve A shows the results obtained with the torque sensor according to the present invention. Curve B shows the results obtained with the conventional torque sensor having four pairs of rectangular amorphous strips attached directly on the measured shaft at 14 mm intervals.

At an applied torque of 80 kg-m, while the torque sensor in accordance with the second embodiment of the present invention produced an output of 900 mV as indicated by curve A, the conventional torque sensor produced an output of only 230 mV.

Figure 10:
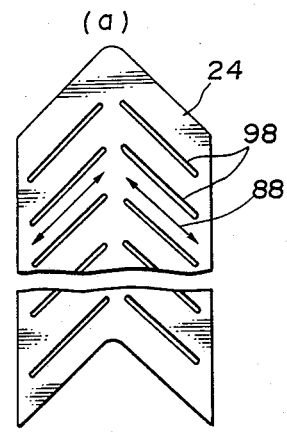
FIGS. 10(a) and 10(b) show a magnetic amorphous film according to a second embodiment of the torque sensor according to this invention.
Figure 10:
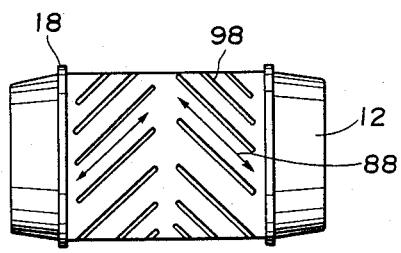
Figure 12:
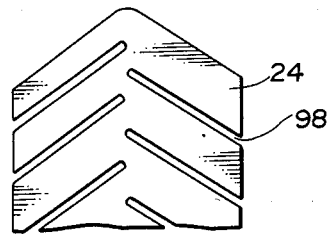
FIG. 12 shows a magnetic amorphous film according to another modification.
Figure 11:
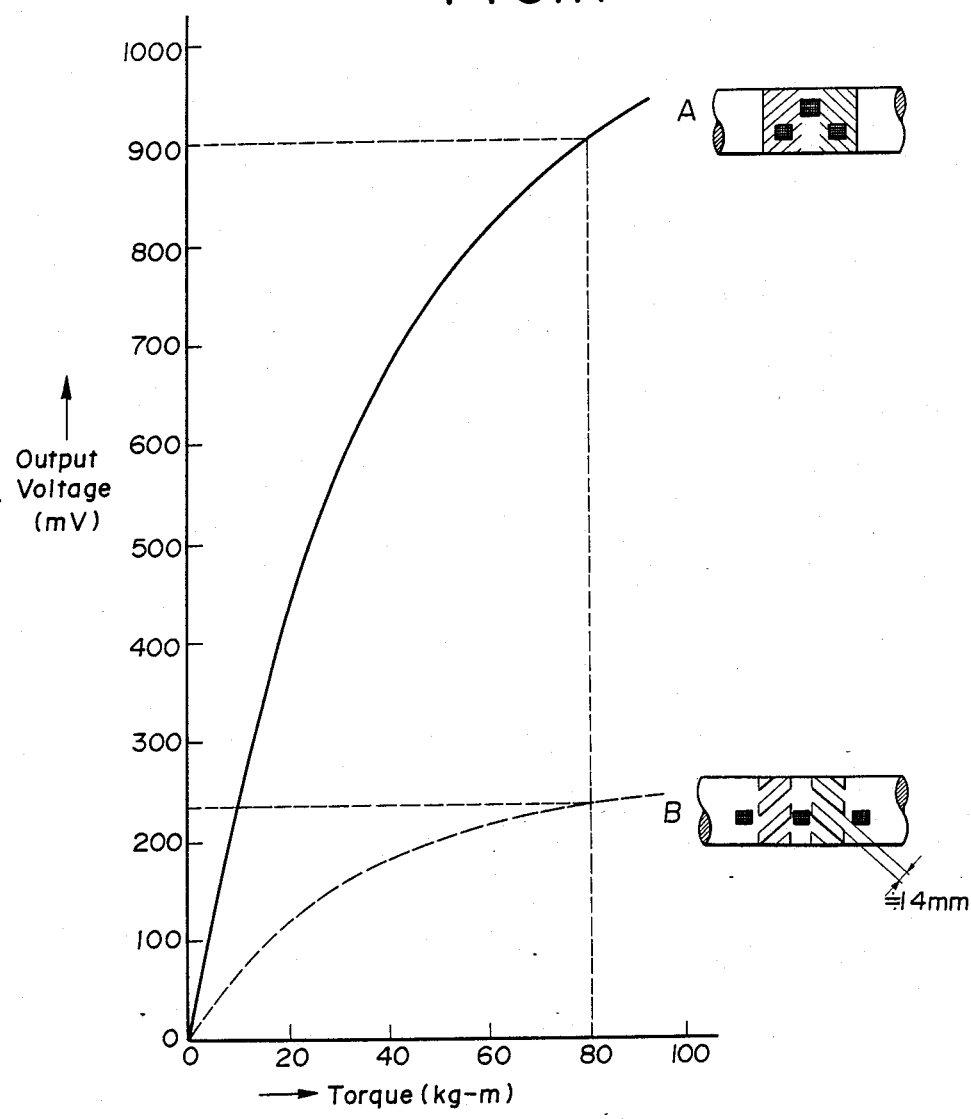
FIG. 11 is a graph showing the results of a test in which the second embodiment was compared with a conventional torque sensor.

FIG. 12 shows a modified version of the magnetic amorphous film shown in FIG. 10 wherein, for the purpose of obtaining enhanced matching with the detection coils, the slits 98 are staggered and are extended to the edge of the magnetic amorphous film. Aside from this modification, the arrangement is the same as that of the second embodiment.

Figure 13:
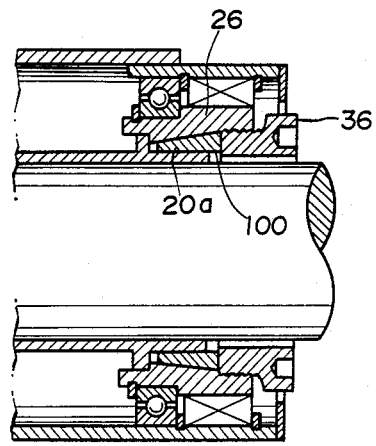
FIGS. 13(a), 13(b), and 13(c) are explanatory views of a third embodiment of the torque sensor according to the invention.
Figure 13:
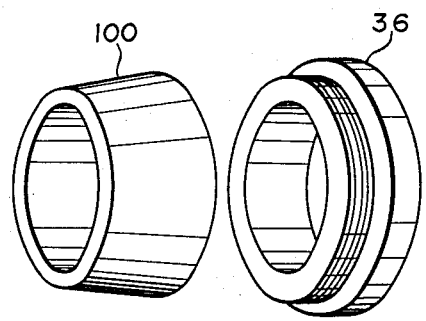
Figure 13:
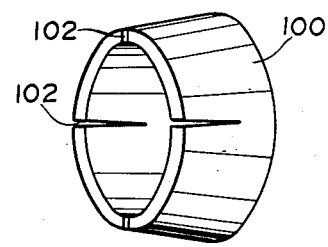

A third embodiment of the torque sensor according to the present invention is shown in FIGS. 13(a), 13(b) and (c). Here the end portions of the cylindrical member 12 are not tapered but are formed in a constant diameter, and attachment to the shaft 14 is achieved using a wedge-shaped tapered ring 100 that is flat on one side. This arrangement facilitates fabrication of the cylinder portion and reduces the total number of components required. In this embodiment, it is possible to further enhance the fastening effect by providing the tapered ring 100 with slits 102 as shown in FIG. 13(c).

Figure 14:
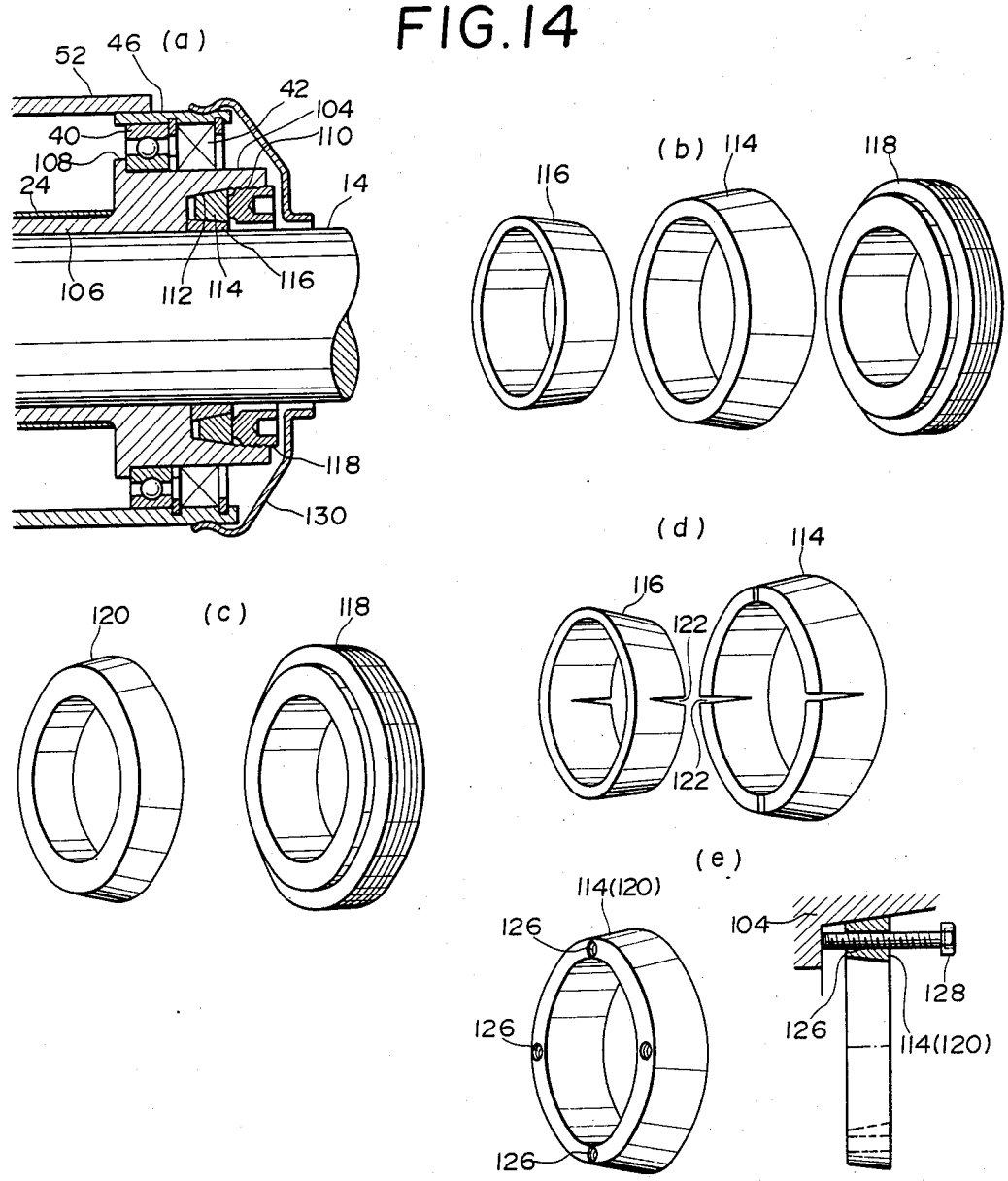
FIGS. 14(a), 14(b), 14(c), 14(d), and 14(e) are explanatory views of a fourth embodiment of the torque sensor according to the invention.

FIGS. 14(a)-(e) shows a fourth embodiment of the torque sensor according to this invention, wherein members corresponding to the cylindrical member and fastening rings of the embodiment of FIG. 1 are integrated as a single cylindrical member 104. Similarly to the first embodiment, positioning collars 108, 108 are provided at either end of a cylindrical portion 106 for attachment of the magnetic amorphous film 24, while the portions outward from the collars 108, 108 up to the opposite ends of the cylindrical member 104 are not tapered but formed at a constant diameter. A bearing 40 and an oil seal 42 are fitted on each of these end portions and an enclosure member 46 is rotatably supported thereon. The outer edges of the end portions of the cylindrical member 104 are formed with a recess having an internal thread 110 near its outer end, followed by a tapered portion 112 which progressively narrows inwardly until reaching an inner wall. The cylindrical member 104 is fixed to the shaft 14 whose torque is to be measured by the frictional force obtained between these two members when a first tapered ring 114 formed with two wedge-like surfaces and a second tapered member 116 formed with a single wedge-like surface (FIG. 14(b)) are forced onto the tapered portion by screwing a threaded retainer ring 118 into the threaded portion of the recess. In place of the rings 114 and 116, there can be used a ring 120 (FIG. 149c)) corresponding to what would be obtained by integrating the said two rings 114, 116. It is also possible to further enhance the gripping force provided by the rings 114 and 116 by providing them with slits 122 as shown in FIG. 14(d). Further, it is convenient to provide the ring 114 (or 120) with threaded holes 126 as shown in FIG. 14(e) so that when the ring is to be removed the operation can be facilitated by screwing screws 128 into the holes 126 until they strike against the inner wall of the cylindrical member 104, whereafter further turning of the screws 128 will result in a reaction force tending to urge the ring 114 (120) outward and away from the tapered portion. Thus while featuring the same ease of attachment to the shaft as the earlier described embodiments, the torque sensor according to this fourth embodiment provided with the ring removal means can, if necessary, also be demounted from the shaft with utmost ease after once being mounted thereon. In its other aspects, this fourth embodiment is the same as the first embodiment. Reference numeral 130 in the figure denotes a cover. The ring 114 (120) in FIG. 14(e) may be divided into a plurality of segments.

Figure 15:
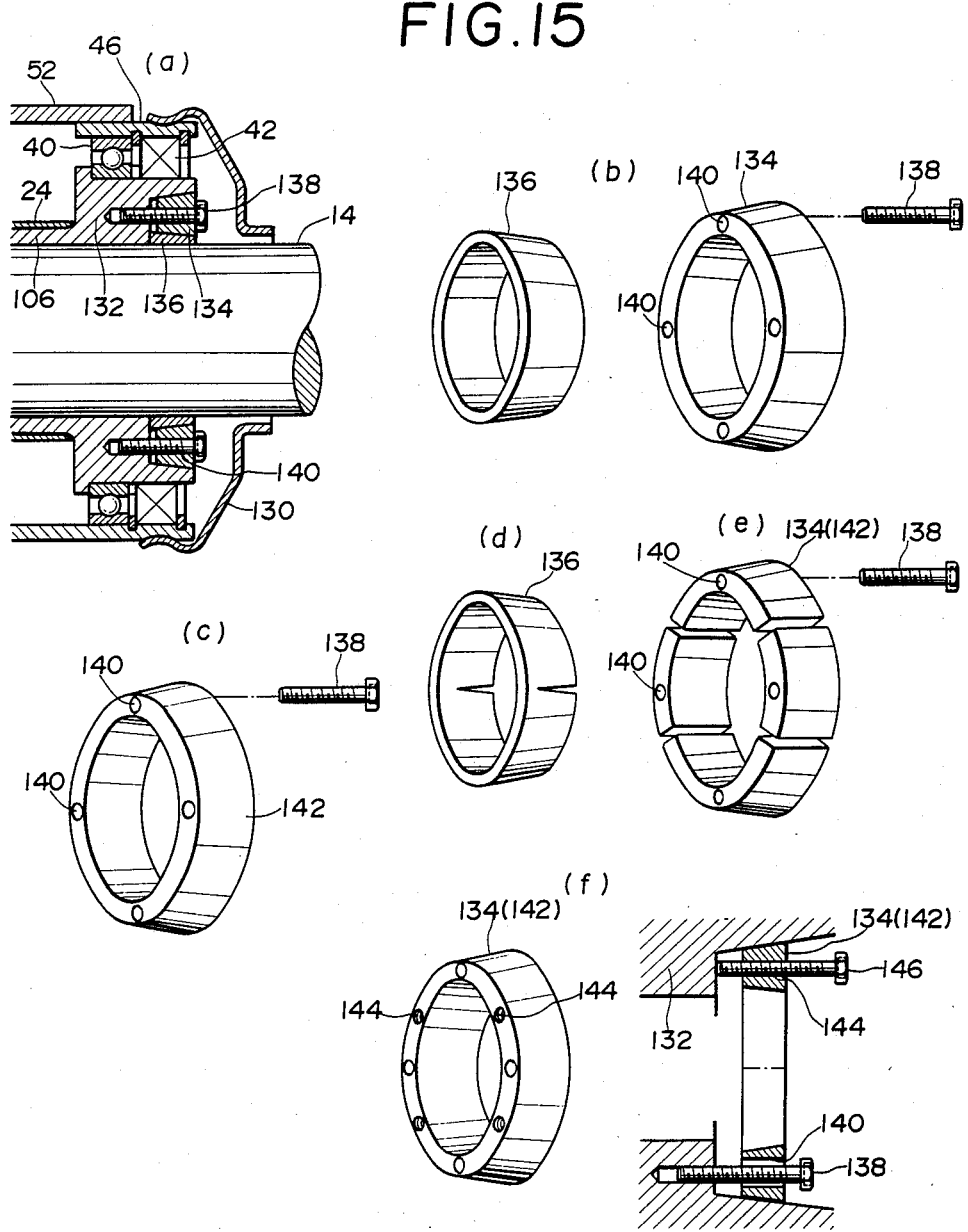
FIGS. 15(a), 15(b), 15(c), 15(d), 15(e), and 15(f) are explanatory views of a fifth embodiment of the torque sensor according to the invention.

The fifth embodiment of the torque sensor according to the invention illustrated in FIGS. 15(a)–(e) involves a further modification of the cylindrical member whereby the length of the cylinder end portions 132 extending outward from the collars are made shorter than in the embodiments described so far, and the retainer rings and associated threads are eliminated. A first tapered ring 134 and a second tapered ring 136 are used here. Here the attachment is realized by the clamping action obtained when the first tapered ring 134 is forced inward by screwing a plurality of clamping screws 138 in thread holes formed in the portion 132 through smooth holes 140 formed in the ring 134 (FIG. 15(b)). Alternatively, it is possible to use an integrated ring 142 as shown in FIG. 15(c), to provide the ring 136 with slits as shown in FIG. 15(d), to use a ring 134 (or 142) divided into a plurality of segments as shown in FIG. 15(e) or to use the ring 134 (or 142) further formed with threaded holes 144 adapted for accommodation of ring removal screws 146. The structure and effect of the removal means are substantially identical to that of the fourth embodiment.

While in the embodiments described in the foregoing, a magnetic amorphous material is used for the magnetic member, the invention is not limited to this and may use any material exhibiting magnetostrictive property.

The method of manufacturing the torque sensor according to the invention will now be explained with reference to FIGS. 16(a)–(h).

Figure 16:
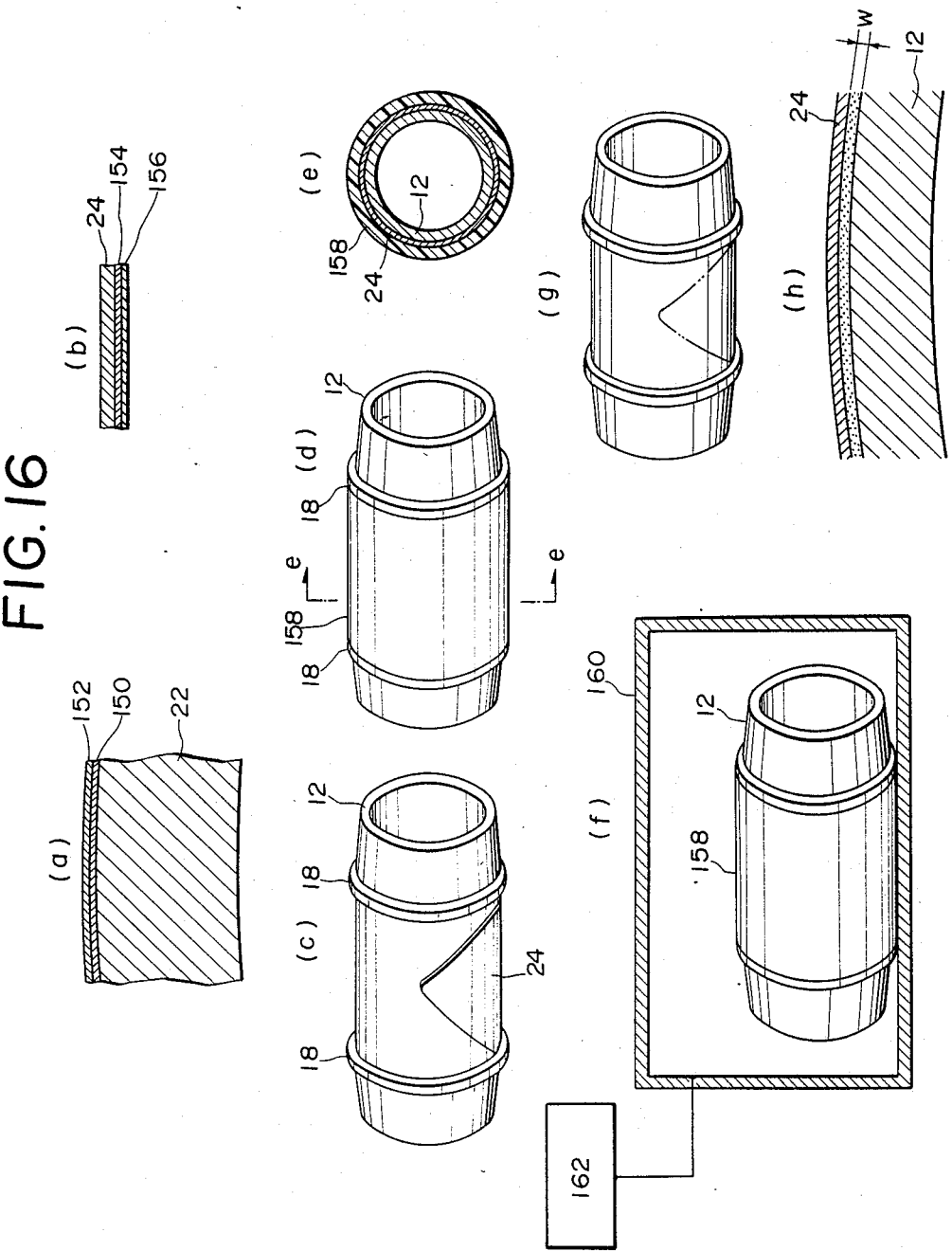
FIGS. 16(a), 16(b), 16(c), 16(d), 16(e), 16(f), 16(g), and 16(h) are explanatory views illustrating the method of manufacturing the torque sensor according to the invention.

As shown in FIG. 16(a), the cylindrical portion 22 of the cylindrical member according to the first embodiment of the invention is first provided with a copper plating 150 and then on top of this with a solder plating 152. The purpose of providing the copper plating 150 is to facilitate the adherence of the solder plating 152.

In parallel with the above, a magnetic amorphous film 24 is similarly provided with a copper plating 154 and over this with a solder plating 156 (FIG. 16(b)).

Next, as shown in FIG. 16(c), the magnetic amorphous film 24 is wound onto the cylindrical member 12 with the solder plated surfaces facing each other. The magnetic amorphous film 24 is formed in the general shape of an arrow and its dimensions are so determined that when it is wrapped once about the cylindrical member 12, the point of the arrow will fit into the notch thereof.

Then as shown in FIG. 16(d) and the sectional view along "e—e" line of FIG. 16(e), a wide, heat-resistant rubber band 158 is placed over the portion of the cylindrical member wound with the magnetic amorphous film 24. The width of the rubber band 158 is made the same as that of the magnetic amorphous film 24, i.e. equal to the wrapped portion (the distance between the collars 18, 18), and, as a result, the wrapped portion receives a uniform pressure over its entire area.

Next, as shown in FIG. 16(f), the cylindrical member 12 with the rubber band 158 thereon is heated by leaving it to stand in a high-temperature tank 160. The temperature within the high-temperature tank 160 is controlled by a temperature control unit 162 so as to maintain it within the range of 280°–300° C., a temperature range in which the magnetic amorphous film 24 suffers no degradation. Heating in the tank is conducted for about 5 to 10 minutes. As the heating in the tank is conducted while the surfaces to be adhered are pressed onto each other, the fused solder moves into all gaps present between the cylindrical member 12 and the amorphous film and that which finds no gaps to fill is forced out to the exterior.

The cylindrical member is then removed from the tank 160 and cooled, as shown in FIG. 16(g), whereafter the rubber band is removed. This completes the bonding operation.

The cylindrical member bearing the magnetic amorphous film is then combined with the enclosure member shown in FIG. 1 and the succeeding figures to obtain a fully assembled torque sensor.

In the manufacturing method according to the invention, since the solder is fused by leaving the cylindrical member in the high-temperature tank with a uniform pressure being applied over the bonding area by the rubber band, the fused solder permeates throughout the whole area of contact between the cylindrical member and the magnetic amorphous film so that no unbonded regions remain. Also since the solder is fused under uniform pressure applied over the entire area by the rubber band, as shown in FIG. 16(h) the distance "w" representing the bonding thickness between the inner surface of the magnetic amorphous film 24 and the outer surface of the cylindrical member 12 is held to a very small value which is uniform over the entire of area of attachment. As a result, no cause exits for slippage between the cylinder member 12 and the magnetic amorphous film 24, or for the development of cracks in the magnetic amorphous film 24. Further, the uniformity of this thickness also means that the distance between the outer surface of the magnetic amorphous film 24 and the coils referred to earlier is maintained constant, resulting in improved measurement accuracy by the torque sensor. In addition, the lack of any voids in the bonding results in an improvement in the service life.

The following test was carried out to observe the performance of the torque sensor manufactured according to the invention. The torque sensor was fabricated using the magnetic amorphous film measuring 4 cm in width and the cylindrical member made of a non-magnetic material (SUS) and measuring 3 cm in diameter and 65 cm in length. Both of these members are subjected to copper plating followed by solder plating. The magnetic amorphous film was then wound on the cylindrical member and the rubber band was fitted thereover to apply a pressure of 2 kg/cm$^2$ to the magnetic amorphous film. The cylindrical member was then left to stand in the high-temperature tank for 10 minutes. The temperature within the tank was maintained at 300° C. The cylindrical member was removed from the tank and allowed to cool for 30 minutes. It was then used to fabricate a torque sensor such as that shown in FIG. 2. The torque sensor was mounted on a shaft for measuring the torque thereof. In the initial measurement, the torque sensor measured the torque within a range of error of ±10%. Twenty test cycles were then carried out for observation of durability. The error in the final test cycle was ±10%, meaning that there was no degradation with use. No cracks or other flaws were observed in the bonded surface.

Since the torque sensor according to the invention is constituted as an independent unit separate from the shaft whose torque is to be measured, in its fabrication it suffices to attach the magnetic member to a cylindrical member which is much shorter than said shaft, so that there is realized a major improvement in the operational efficiency of, for example, an assembly process for an automobile equipped with the torque sensor. Also, there are realized advantages in regard to the control of component dimensional accuracy, particularly regarding maintaining a uniform gap between the surface of the magnetic amorphous material and the coils, which makes it possible to manufacture torque sensors with reduced variance in performance from unit to unit.

In addition, the manufacturing method according to the invention enables the torque transmission member and the magnetic member to be attached to each other uniformly without any unbonded regions being left between them and with the separation between these two members being held to a very small uniform value throughout their entire area. As a result, there is no risk of slippage occurring between the magnetic member and the torque transmission member, so that there is obtained both an improvement in measurement accuracy and a longer service life.

The present invention has thus been shown and described with reference to specific embodiments. However, it should be noted that the present invention is in no way limited to the details of the described arrangements but changes and modifications may be made without departing from the scope of the appended claims.

What is claimed is:

1. A method of manufacturing a torque sensor comprising the steps of:
   a. plating a torque transmission member and a magnetic member destined to be attached to the surface thereof first with copper and then with solder,
   b. wrapping the magnetic member onto the torque transmission member, and
   c. solder-bonding the torque transmission member and the magnetic member by heating them while uniform pressure is being applied to the entirety of the wrapped member.

2. A method of manufacturing a torque sensor according to claim 1 wherein the heating is carried out at a temperature of not more than 300° C. for a period of 5 to 10 minutes.

3. A method of manufacturing a torque sensor according to claim 2 wherein the torque transmission member is a separate member from the shaft whose torque is to be measured and is constituted as a cylindrical member mountable on said shaft.

4. A method of manufacturing a torque sensor according to claim 1 wherein the torque transmission member is a separate member from the shaft whose torque is to be measured and is constituted as a cylindrical member mountable on said shaft.

5. A method of manufacturing a torque sensor including a torque transmission member having a magnetic metallic film, comprising the steps of:
   plating solder onto the torque transmission member and magnetic film respectively forming solder plated surfaces on said member and said film;
   wrapping the metallic film onto the torque transmission member with the solder plated surfaces of the torque transmission member and metallic film facing each other; and
   heating the torque transmission member and metallic film to be soldered while pressing the metallic film onto the torque transmission member.

6. The method of claim 5 further comprising the steps of plating the torque transmission member and metallic film with copper prior to solder plating.

7. The method of claim 6 wherein said heating is carried out at a temperature of not more than 300° C. for a period of approximately five to ten minutes.

8. The method of claim 7 wherein the metallic film is pressed onto the torque transmission member at a pressure of approximately 2 kg/cm$^2$.

9. The method of claim 5 wherein said torque transmission member comprises a cylindrical member which is mountable onto a shaft whose torque is to be measured.

10. The method of claim 9 wherein said film comprises a magnetostrictive amorphous film having a uniaxial magnetic anisotropy along a pre-determined angle with respect to a longitudinal axis of said torque transmission member.

11. The method of claim 10 wherein said metallic film has a plurality of slits formed along said uniaxial magnetic anisotropy.

12. The method of claim 11 wherein said slits are staggered with respect to each other.

* * * * *